United States Patent
Koga et al.

(10) Patent No.: US 7,752,358 B2
(45) Date of Patent: Jul. 6, 2010

(54) STORAGE APPARATUS AND CONVERSION BOARD FOR INCREASING THE NUMBER OF HARD DISK DRIVE HEADS IN A GIVEN, LIMITED SPACE

(75) Inventors: Tsutomu Koga, Matsuda (JP); Mitsuru Inoue, Hiratsuka (JP)

(73) Assignee: Hitachi, Ltd, Tokyo (JP)

( * ) Notice: Subject to any disclaimer, the term of this patent is extended or adjusted under 35 U.S.C. 154(b) by 876 days.

(21) Appl. No.: 11/519,831

(22) Filed: Sep. 13, 2006

(65) Prior Publication Data

US 2008/0034155 A1 Feb. 7, 2008

(30) Foreign Application Priority Data

Jul. 24, 2006 (JP) .............................. 2006-201176

(51) Int. Cl.
- H02B 1/00 (2006.01)
- H05K 5/00 (2006.01)
- G06F 1/16 (2006.01)
- G06F 13/12 (2006.01)
- G06F 13/00 (2006.01)

(52) U.S. Cl. .................... 710/62; 361/600; 361/679.01; 361/679.02; 361/679.33; 711/100; 711/114

(58) Field of Classification Search ................. 361/600, 361/679.01, 679.02, 679.31–679.33, 685, 361/728–747; 710/1, 2, 3, 62, 64, 72, 74; 711/100, 101, 111, 112, 114

See application file for complete search history.

(56) References Cited

U.S. PATENT DOCUMENTS

| | | | | |
|---|---|---|---|---|
| 2004/0085722 | A1* | 5/2004 | Tanzer et al. | 361/683 |
| 2004/0088482 | A1* | 5/2004 | Tanzer et al. | 711/114 |
| 2004/0162940 | A1 | 8/2004 | Yagisawa et al. | |
| 2005/0138315 | A1* | 6/2005 | Eguchi et al. | 711/165 |

FOREIGN PATENT DOCUMENTS

| | | |
|---|---|---|
| JP | 06-084338 | 9/1992 |
| JP | 08-137631 | 11/1994 |

* cited by examiner

*Primary Examiner*—Niketa I Patel
*Assistant Examiner*—Richard Franklin
(74) *Attorney, Agent, or Firm*—Foley & Lardner LLP

(57) ABSTRACT

The invention proposes a storage apparatus and conversion board that can increase the number of hard disk drive heads in a given, limited space for installation of disk units in the storage apparatus, and can consequently improve data read/write performance.

A storage apparatus has a plurality of first disk units of a specific size, each removable, and a controller that controls data read/write from/to the first disk units, and the storage apparatus includes: external connectors, each provided in corresponding positions where the first disk units are installed, and physically and electrically connected with the first disk units installed in a specific state; and a removable conversion unit provided in one or more of the external connectors, and used for installing, in the position where one or more of the first disk units are to be installed, a larger number of second disk units, each smaller in physical size, than the one or more first disk units.

14 Claims, 14 Drawing Sheets

| FC PORT ADDRESS (65A) | SAS PORT ADDRESS (65B) |
|---|---|
| 4 | 1, 4 |
| 5 | 2, 5 |
| 6 | 3 |

65

START — SP0

INSTALL HDDs IN HDD CASE — SP1

SET FC PORT ADDRESSES AND SAS PORT ADDRESSES — SP2

END — SP3

FIG.15

| FC PORT ADDRESS | SAS PORT ADDRESS |
|---|---|
| 1 | 1 |
| 2 | 2 |
| 3 | 3 |
| . | . |
| . | . |
| . | . |
| m | m |

65A · 65B · 65

STORAGE APPARATUS AND CONVERSION BOARD FOR INCREASING THE NUMBER OF HARD DISK DRIVE HEADS IN A GIVEN, LIMITED SPACE

CROSS-REFERENCES TO RELATED APPLICATIONS

This application relates to and claims priority from Japanese Patent Application No. 2006-201176, filed on Jul. 24, 2006, the entire disclosure of which is incorporated herein by reference.

BACKGROUND

1. Field of the Invention

The present invention relates to a storage apparatus and a conversion board. This invention is suited for use in a storage apparatus that uses 3.5-inch hard disk drives as disk units.

2. Description of Related Art

Lately, storage apparatuses that can offer increased total capacity and improved data access speed and reliability at the same time by managing a plurality of disk units, such as hard disk drives (herein after also referred to as HDDs), based on RAID (Redundant Array of Inexpensive Disks) have been put into practical use.

In this type of storage apparatus, a high-speed data transfer system called Fibre Channel is normally used to transfer data to disk units, and 3.5-inch HDDs utilizing the above Fibre Channel are mainstream disk units installed in this type of storage apparatus.

Meanwhile, another data transfer system called SAS (Serial Attached SCSI), which realizes a high processing speed second to Fibre Channel and has a much larger total number of connectable disk units than in Fibre Channel, has started to be used, and, instead of 3.5-inch HDDs utilizing Fibre Channel, inexpensive 2.5-inch HDDs utilizing SAS are expected to be the mainstream disk units installed in storage apparatuses in the future.

Under the current circumstances, an optimal design is a storage apparatus using both 3.5-inch HDDs and 2.5-inch HDDs in combination, taking into account the desired processing speed and price.

Regarding techniques for installing two or more types of HDD in a storage apparatus, for example, Japanese Patent Laid-open Publication No. H06-084338 and Japanese Patent Laid-open Publication No. H08-137631 disclose techniques for installing a plurality of 2.5-inch HDDs in a storage apparatus case having 5.25-inch HDDs installed therein.

SUMMARY 2.5-inch HDDs are smaller than 3.5-inch HDDs in physical size (outer size). So, when designing a storage apparatus to include 2.5-inch HDDs and 3.5-inch HDDs in combination as above, if the 2.5-inch HDDs and 3.5-inch HDDs are installed in the same installation pattern, a problem arises in that unused spaces are created because of their difference in physical size between the 3.5-inch HDD and 2.5-inch HDD, and that translates into unused capacity.

Another problem in designing a storage apparatus to include a combination of two or more types of hard disk drive as above is the need for complicated protocol control. That is because 3.5-inch HDDs and 2.5-inch HDDs are based on different data transfer protocols, the former based on Fibre Channel Protocol, and the latter based on SAS Protocol, i.e., 3.5-inch HDDs and 2.5-inch HDDs cannot communicate with each other even if data transfer is attempted between them.

In light of the above, an object of the present invention is to propose a storage apparatus and conversion board that can increase the number of hard disk drive heads in a given, limited space for installation of disk units in the storage apparatus, and can consequently improve data read/write performance.

In order to achieve the above object, the invention provides a storage apparatus having a plurality of first disk units of a specific size, each removable, and a controller that controls data read/write from/to the first disk units, the storage apparatus including: external connectors, each provided in corresponding positions where the first disk units are installed, and physically and electrically connected with the first disk units installed in a specific state; and a removable conversion unit provided in one or more of the external connectors, and used for installing, in the position where one or more of the first disk units are to be installed, a larger number of second disk units, each smaller in physical size, than the one or more first disk units.

Accordingly, in a given, limited space for installation of disk units in the storage apparatus, it is possible to manage the difference in physical size between two or more types of hard disk drives, and also to install a large number of those different types of hard disk drives in combination. It is also possible to increase data storage capacity within the limited storage apparatus space for installation of disk units.

The invention also provides a conversion board for use in a storage apparatus in which a plurality of first disk units of a specific size, each removable, is installed, the conversion board including: a board of a specific size; one or more first connectors, each provided on one side of the board and physically and electrically connected with one or more external connectors, each provided in corresponding positions in the storage apparatus where the first disk units are installed; and a plurality of second connectors, each provided on the other side of the board in corresponding positions where second disk units are installed, and physically and electrically connected with the second disk units installed in a specific state, wherein the first connectors are electrically connected with the corresponding second connectors.

Accordingly, in a given, limited space for installation of disk units in the storage apparatus, it is possible to manage the difference in physical size between two or more types of hard disk drives, and also to install a large number of those different types of hard disk drives in combination. It is also possible to increase data storage capacity within the limited storage apparatus space for installation of disk units.

According to the present invention, it is possible to install a large number of different types of hard disk drive in combination in a given, limited space or installation of disk units in the storage apparatus, and thus the number of hard disk drive heads can be increased. As a result, data storage capacity will increase, and data read/write performance for the hard disk drives can be improved.

Other aspects and advantages of the invention will be apparent from the following description and the appended claims.

BRIEF DESCRIPTION OF THE DRAWINGS

FIG. 15 is a conceptual diagram of an address management table according to the fourth embodiment.

DETAILED DESCRIPTION OF PREFERRED EMBODIMENTS

Preferred embodiments of the invention will be explained in detail with reference to the attached drawings.

(1) First Embodiment (1-1) Storage System Configuration in First Embodiment

First, a storage system according to a first embodiment will be described in detail below.

Figure 1:
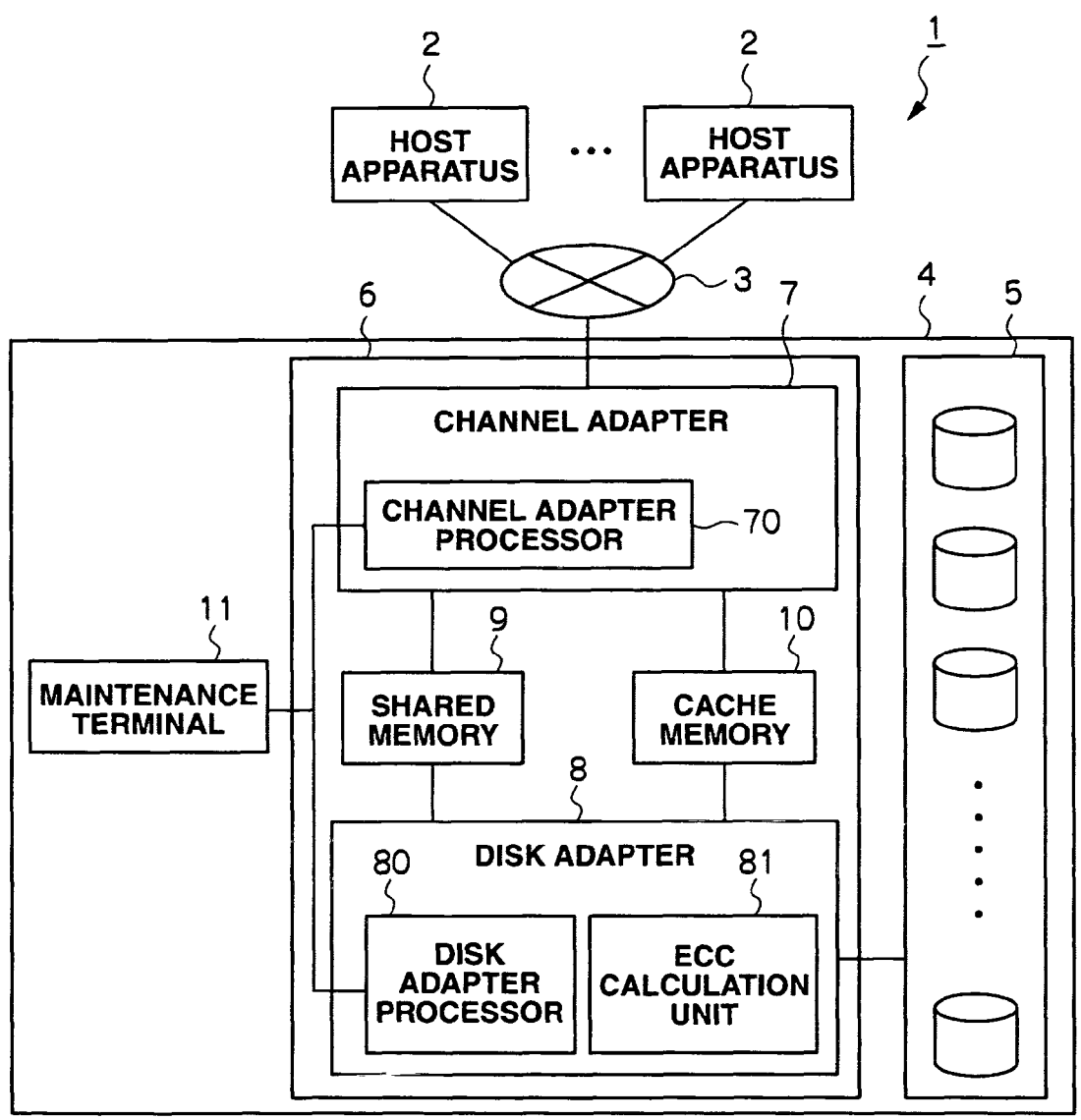
FIG. 1 is a block diagram illustrating the overall configuration of a storage system according to a first embodiment of the invention.

FIG. 1 illustrates a storage system 1 according to a first embodiment as a whole. This storage system 1 is configured by connecting host apparatuses 2 and a storage apparatus 4 via a network 3.

The host apparatuses 2 are computer devices having information processing resources, such as a CPU (Central Processing Unit) and memory, and are selected from, for example, personal computers, workstations, or mainframes. The host apparatuses 2 are also provided with information input devices such as a keyboard, switch, pointing device, and microphone (not shown in the drawing), and information output devices such as a monitor display and speaker (not shown in the drawing).

The network 3 is, for example, a SAN (Storage Area Network), LAN (Local Area Network), internet, public line, dedicated line, or similar. Communication between the host apparatuses 2 and the storage apparatus 4 via the above network 3 is performed in accordance with, for example, Fibre Channel Protocol if the network 3 is a SAN, or TCP/IP (Transmission Control Protocol/Internet Protocol) if the network 3 is a LAN.

The storage apparatus 4 is configured to include: a disk drive unit 5 composed of a plurality of hard disk drives 50A and 50B; a controller 6 that controls each of the hard disk drives 50A and 50B based on RAID; and a maintenance terminal 11.

The hard disk drives 50A and 50B are, for example, expensive hard disk drives, such as SCSI (Small Computer System Interface) disks, or inexpensive hard disk drives, such as SATA (Serial AT Attachment) disks. In the first embodiment, the plurality of hard disk drives 50A and 50B in the disk drive unit 5 is composed of 3.5-inch HDDs 50A using Fibre Channel and 2.5-inch HDDs 50B using SAS.

An ECC (Error Correcting Code) group, which is a basic RAID-based unit, is made up of one (or more) hard disk drives 50A (and 50B), and one or more logically defined volumes (hereinafter referred to as logical volumes, not shown in the drawing) are established in a storage area provided by each hard disk drive constituting that ECC group. The host apparatuses 2 read/write data from/to the logical volumes in blocks of a specific size.

Each logical volume is given a unique identifier (LUN: Logical Unit Number). In this embodiment, an address is composed of the above identifier and a uniquely assigned number for each block (LBA: Logical Block Address), and user data is input/output designating a specific address of that type.

The controller 6 is configured to include a channel adapter 7, shared memory 9, cache memory 10 and a disk adapter 8.

The channel adapter 7 is configured as a microcomputer system having a channel adapter processor 70, memory, a communication interface (not shown in the drawing), etc., and also has ports (not shown in the drawing) for connection to the network 3. The channel adapter 7 interprets various commands sent from the host apparatuses 2 and performs the necessary processing. Each port of the channel adapter 7 is given a network address to be identified (such as an IP address or WWN), by which the channel adapter 7 can function as NAS (Network Attached Storage). The channel adapter 7 is connected with the shared memory 9, cache memory 10 and maintenance terminal 11 via a switch—e.g. an ultra-high-speed cross-bus switch that executes data transmission by high-speed switching, a bus, or similar.

The disk adapter 8 is configured as a microcomputer system having a disk adapter processor 80, ECC calculation unit 81, and memory (not shown in the drawing), etc., and functions as an interface that conducts protocol control in communication with the hard disk drives 50A and 50B. The disk adapter 8 according to the first embodiment is connected to the hard disk drives 50A and 50B via Fibre Channel cables, and sends/receives data to/from those hard disk drives 50A and 50B in accordance with Fibre Channel Protocol or SAS Protocol. The ECC calculation unit 81 calculates parity, which is a redundant code to be added to the original data.

The shared memory 9 is storage memory shared by the channel adapter 7 and the hard disk drives 50A and 50B. The shared memory 9 is mainly used to store system configuration information or various control programs read from the system volume when the storage apparatus 4 is powered on, and also to store commands sent from the host apparatuses 2.

The cache memory 10 is storage memory shared by the channel adapter 7 and the hard disk drives 50A and 50B too. The cache memory 10 is mainly used to temporarily store user data input/output to/from the storage apparatus 4.

The maintenance terminal 11 is a computer device used to maintain and manage the storage apparatus 4. The maintenance terminal 11 is connected to the host apparatuses 2 via the network 3, so it can receive data or commands from the host apparatuses 2. The maintenance terminal 11 also monitors the storage apparatus 4 for failure occurrence.

In the so-configured storage system 1, when a data write request is made from the host apparatuses 2, the relevant data is temporarily stored in the cache memory 10 via the channel adapter 7. When the disk adapter processor 80 is provided, via the shared memory 9, with information that the relevant data has been written to the cache memory 10, the disk adapter processor 80 obtains the data from the cache memory 10 and writes it to the hard disk drives 50A and 50B in the disk device unit 5. When a data read request is made, the above processes are reversed to read data.

(1-2) External Configuration (1-2-1) Entire Configuration Overview

Figure 2:
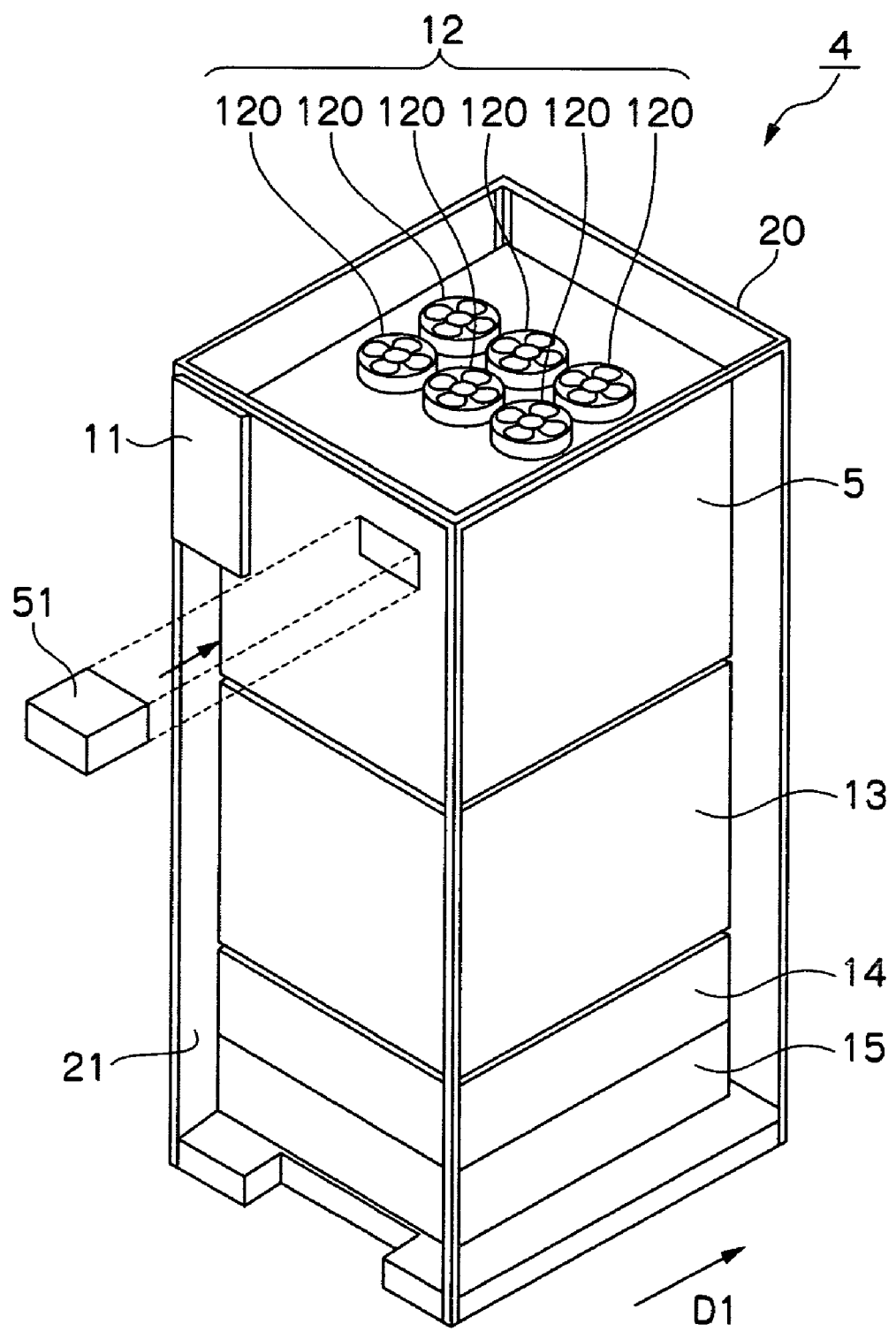
FIG. 2 schematically illustrates the configuration of a storage apparatus according to the first embodiment.

FIG. 2 is an overview of the entire configuration of the storage apparatus 4. The storage apparatus 4 according to the first embodiment is composed, mainly, of a fan unit 12, a disk drive unit 5, a logical module 13, a battery unit 14 and a power supply unit 15.

The above units and module are installed in a case 20, which forms the main frame of the storage apparatus 4. Mount frames (not shown in the drawing) are formed in multiple levels in the longitudinal direction D1 on internal side surfaces 21 of the case 20, and each unit and module is installed in the case along the mount frame, like drawers. The fan unit 12 and the disk drive unit 5 are installed in the top level of the case 20, the logical module 13 is in the middle level, and the battery unit 14 and the power supply unit 15 are in the bottom level. Furthermore, the maintenance terminal 11 is attached to one side surface of the case.

The fan unit 12 is composed of a plurality of fans 120 for forced-air-cooling the interior of the disk drive unit 5.

The disk drive unit 5 is composed of a plurality of hard disk drives 50A and 50B. In the first embodiment, the disk drive unit 5 is configured to have cases 51 for 3.5-inch HDDs (hereinafter referred to as 3.5-inch HDD cases 51) each case containing a plurality of hard disk drives 50A and 50B composed of the 3.5-inch HDDs 50A and 2.5-inch HDDs 50B. The details are explained later.

The logical module 13 contains a plurality of logical substrates for controlling the storage apparatus 4, and incorporates the above-described controller 6.

The battery unit 14 incorporates a secondary battery. The battery unit 14 functions as a backup power supply for feeding power to the disk drive unit 5 and others, if power from the AC/DC power supply stops, for example, due to electricity failure.

The power supply unit 15 incorporates an AC/DC power supply, and is connected with a power supply controller board (not shown in the drawing) for monitoring the status of the AC/DC power supply. The power supply unit 15 is set so that it can feed power to the disk drive unit 5 in response to the signals from the power source controller board.

(1-2-2) External Configuration of Disk Drive Unit

Figure 3:
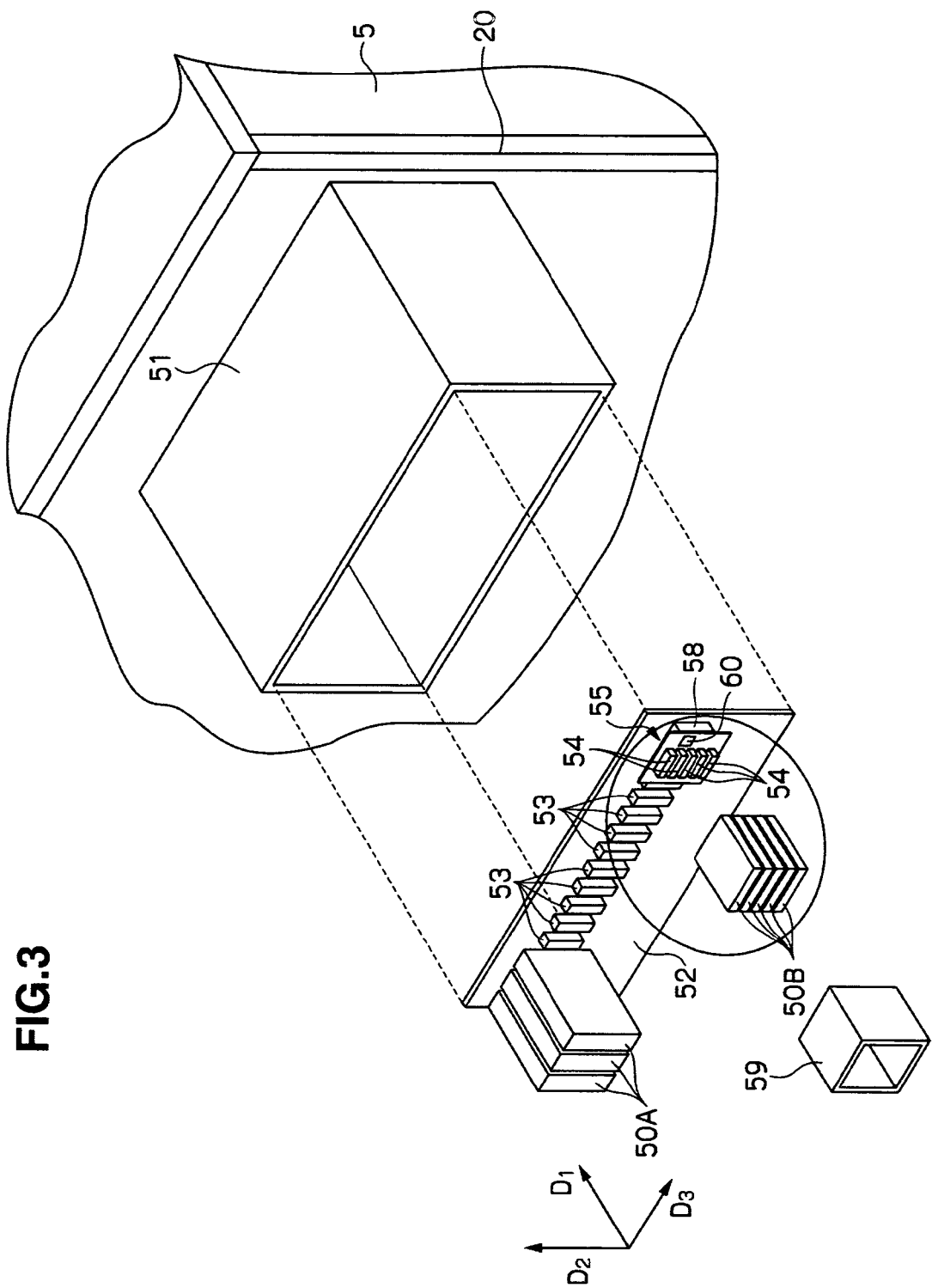
FIG. 3 is an enlarged view of a part of the storage apparatus case according to the first embodiment.
Figure 4:
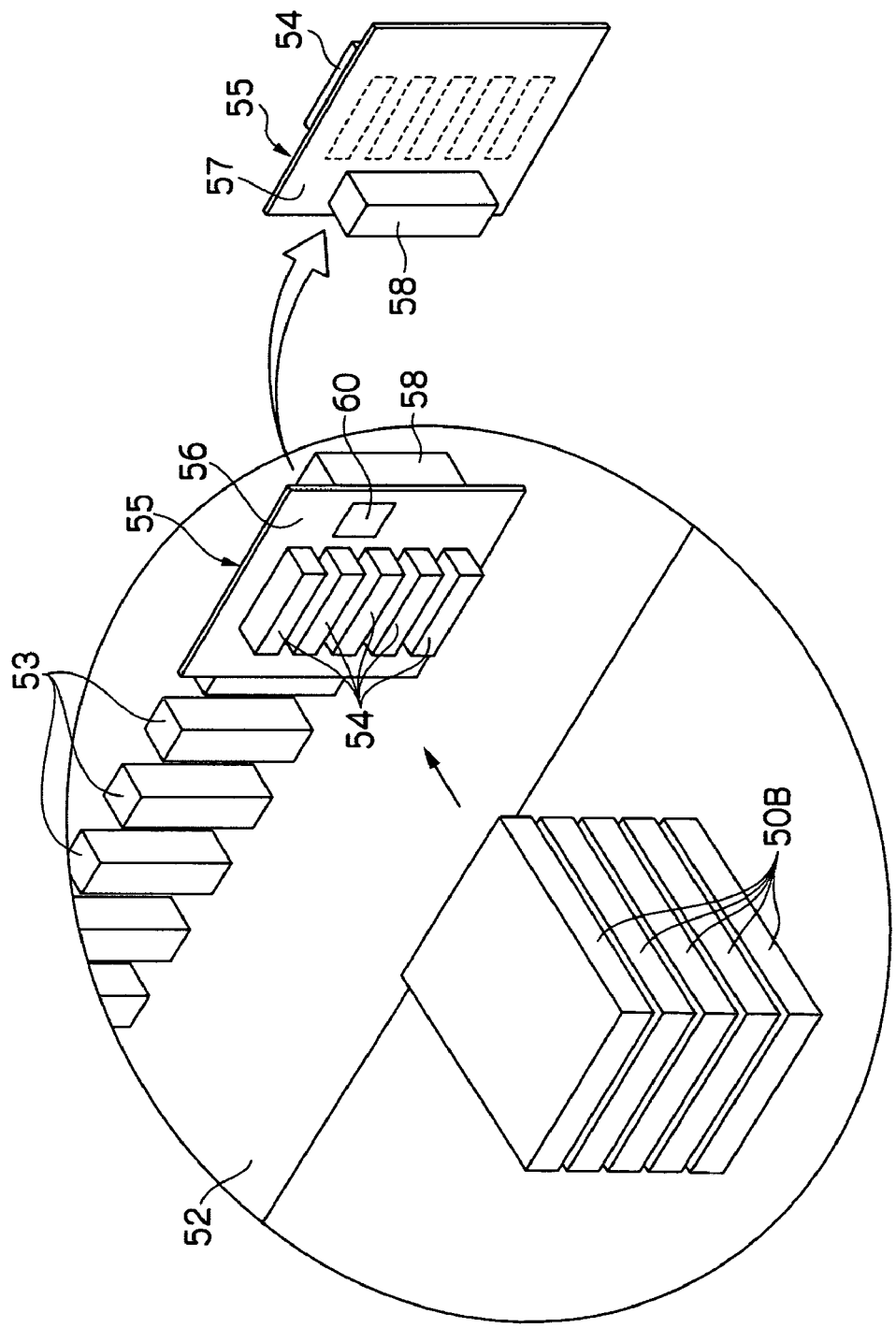
FIG. 4 illustrates the correlation between the front and back surfaces of a unit board according to the first embodiment.

The first embodiment is characterized in that the 3.5-inch HDDs 50A and the 2.5-inch HDDs 50B can be installed together in the limited space for installation of disk units in the storage apparatus 4. The external configuration of the disk drive unit 5 for achieving the above feature will be explained in detail below. FIGS. 3 and 4 each illustrate the external configuration of the disk drive unit 5.

FIG. 3 is an enlarged view of a part of one of the 3.5-inch HDD cases 51 installed in the disk drive unit 5 in multiple rows and columns.

The 3.5-inch HDD case 51 contains a plurality of 3.5-inch HDDs 50A and a plurality of 2.5-inch HDDs 50B. Also, the 3.5-inch HDD case 51 is configured to incorporate a board 52 for 3.5-inch HDDs (hereinafter referred to as 3.5-inch HDD board), that can slide in the direction D1 from the front (side) to the back (side) in FIG. 3 to be placed inside the 3.5-inch HDD case 51.

Connectors 53 for Fibre Channel (hereinafter referred to as FC connectors) are formed on the 3.5-inch HDD board 52, each connector arranged in the vertical direction (longitudinal direction) D2, and the plurality of FC connectors 53 is configured so that one 3.5-inch HDD 50A can be fitted into one FC connector 53 in the vertical direction (longitudinal direction) D2.

Furthermore, a conversion board 55 for installing the 2.5-inch HDDs 50B is connected with one of the plurality of FC connectors 53, FC connector 58.

The conversion board 55 has a plurality of SAS connectors 54, each arranged in a horizontal direction (lateral direction) D3, and also has a protocol conversion chip 60.

The plurality of SAS connectors 54 is configured so that one 2.5-inch HDD 50B can be fitted into one SAS connector 54 in the horizontal direction (lateral direction) D3. A case 59 for 2.5-inch HDDs holds the 2.5-inch HDDs 50B inside.

The first embodiment employs a configuration where one conversion board 55 with five horizontally (laterally, in direction D3)-arranged 2.5-inch HDDs 50B is installed in an area on the 3.5-inch HDD board 52 where three 3.5-inch HDDs 50A are installed in the vertical direction (longitudinal direction) D2. In other words, in terms of general physical size, three 3.5-inch HDDs 50A and five 2.5-inch HDDs 50B are configured to be approximately the same size.

FIG. 4 illustrates the correlation between the front surface 56 and back surface 57 of the conversion board 55. As shown in FIG. 4, the conversion board 55 is configured to be connected with at least one FC connector 58. In the first embodiment, the FC connector 58 is connected to the back surface 57 of the conversion board 55—the surface opposite to the surface where the protocol conversion chip 60 is installed, but the invention is not limited to this embodiment.

(1-3) Protocol Conversion Function (1-3-1) Internal Configuration of Protocol Conversion Chip The first embodiment is characterized in using the protocol conversion chip 60 as a specific means to enable installation of the 3.5-inch HDDs 50A and 2.5-inch HDDs 50B together in the limited space for disk unit installation in the storage apparatus 4. The internal configuration of the protocol conversion chip 60 for realizing the above feature will be explained below.

Figure 5:
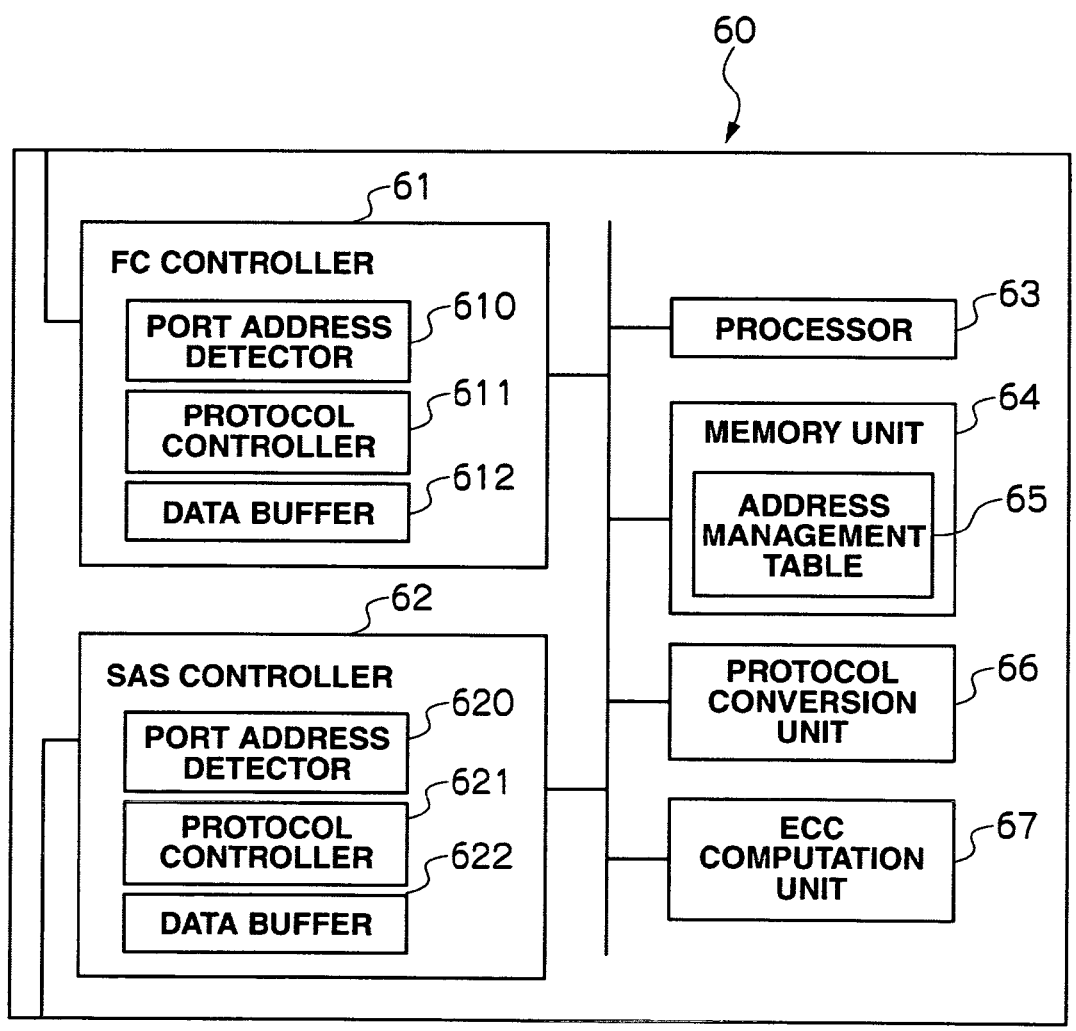
FIG. 5 is a block diagram illustrating the internal configuration of a protocol conversion chip according to the first embodiment.

FIG. 5 is a block diagram illustrating the internal configuration of the protocol conversion chip 60.

The protocol conversion chip 60 functions as an address conversion unit for converting a port address given to a 3.5-inch HDD 50A to a port address given to a 2.5-inch HDD 50B, and vice versa, and also functions as a protocol conversion unit for converting Fibre Channel Protocol used for data transfer with the 3.5-inch HDDs 50A to SAS Protocol used for data transfer with the 2.5-inch HDDs 50B, and vice versa.

More specifically, in the case of data-write, the protocol conversion chip 60 functions to convert a port assigned to a 3.5-inch HDD 50A to a port assigned to a 2.5-inch HDD 50B, and also to convert Fibre Channel Protocol to SAS Protocol. In the case of data-read, the protocol conversion chip 60 functions to convert a port assigned to a 2.5-inch HDD 50B to a port assigned to a 3.5-inch HDD 50A, and also to convert SAS Protocol to Fibre Channel Protocol.

The protocol conversion chip 60 incorporates a Fibre Channel controller (hereinafter referred to as an FC controller) 61, an SAS controller 62, a processor 63, a memory unit 64, a protocol conversion unit 66, and an ECC computation unit 67.

The FC controller 61 manages and controls data and data-read/write requests transferred between the disk adapter 8 and the 3.5-inch HDDs 50A utilizing a data transfer system based on Fibre Channel Protocol. The FC controller 61 has a port address detector 610, a protocol controller 611 and a data buffer 612.

The port address detector 610 identifies port addresses for the 3.5-inch HDDs 50A utilizing a Fibre Channel Protocol based data transfer system. The protocol controller 611 manages the protocol running from the disk adapter 8 to the 3.5-inch HDDs 50A. The data buffer 612 functions as a storage unit for temporarily storing data input to the protocol conversion chip 60 and then written to the 2.5-inch HDDs 50B, and data read from the 2.5-inch HDDs 50B and then output from the protocol conversion chip 60.

Likewise, the SAS controller 62 manages and controls data and data-read/write requests transferred between the disk adapter 8 and the 2.5-inch HDDs 50B utilizing an SAS Protocol based data transfer system. The SAS controller 62 has a port address detector 620, a protocol controller 621, and a data buffer 622.

The port address detector 620 identifies port addresses for the 2.5-inch HDDs 50B utilizing an SAS Protocol based data transfer system. The protocol controller 621 manages the protocol running from the disk adapter 8 to the 2.5-inch HDDs 50B. The data buffer 622 functions as a storage unit for temporarily storing data input/output to/from the protocol conversion chip 60.

The processor 63 executes basic computation processing in the protocol conversion chip 60. In particular, the processor 63 reads an address management table 65 stored in the memory unit 64, which is explained below, and executes computation processing.

The memory unit 64 is storage memory shared by the FC controller 61 and SAS controller 62. The memory unit 64 stores an address management table 65.

The protocol conversion unit 66 converts parameters. More specifically, the protocol conversion unit 66 converts parameters for a read/write request command, between a 3.5-inch HDD 50A port address and a 2.5-inch HDD 50B port address, and also between Fibre Channel Protocol and SAS Protocol.

The ECC computation unit 67 is used to compute parity, which is a redundant code to be added to the original data, and incorporates an ECC computation circuit (not shown in the drawing).

(1-3-2) Address Management Table

Next, the address management table 65 stored in the memory unit 64 mentioned in FIG. 5 is explained with reference to FIG. 6.

The address management table 65 functions as an address conversion unit for managing and converting the 3.5-inch HDD 50A port addresses and the 2.5-inch HDD 50B port addresses so that both 3.5-inch and 2.5-inch HDDs can be installed together in the limited space for installation of disk units in the storage apparatus 4. The address management table 65 is composed of an "FC port address" field 65A and an "SAS port address" field 65B.

The "FC port address" field 65A stores a port address for a 3.5-inch HDD 50A that utilizes a Fibre Channel Protocol based data transfer system. The "SAS port address" field 65B stores a port address for a 2.5-inch HDD 50B that utilizes an SAS Protocol based data transfer system.

Figures 6, 8:
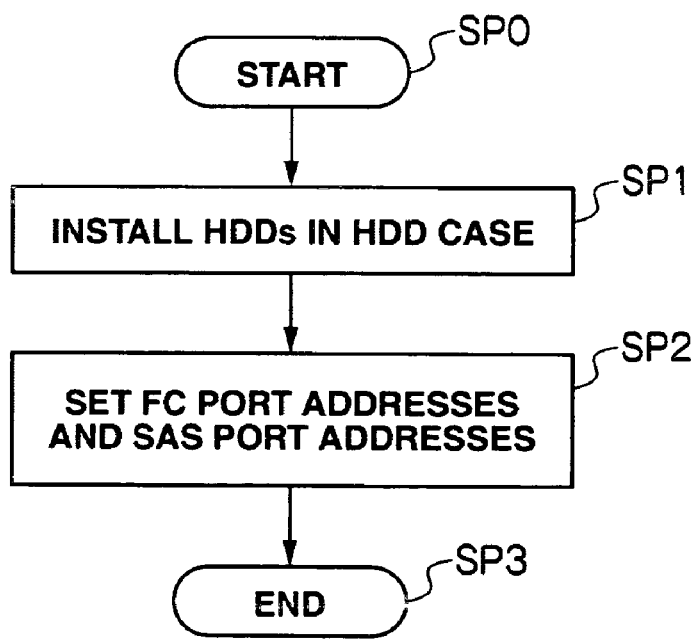
FIG. 6 is a conceptual diagram of an address management table according to the first embodiment.
FIG. 8 is a flowchart explaining initial setting procedures for the storage apparatus according to the first embodiment.

For example, the address management table 65 in FIG. 6 shows that a 3.5-inch HDD 50A port address of "4" is associated with 2.5-inch HDD 50B port addresses of "1" and "4." Likewise, the table also shows that a 3.5-inch HDD 50A port address of "5" is associated with 2.5-inch HDD 50B port addresses of "2" and "5," and that a 3.5-inch HDD 50A port address of "6" is associated with a 2.5-inch HDD 50B port address of "3."

In the first embodiment, since three 3.5-inch HDDs 50A are associated with five 2.5-inch HDDs 50B, the address management table 65 stores the association as shown in FIG. 6. The number of port addresses stored in one field varies depending on how many hard disk drives are associated with how many other hard disk drives. For example, if four 3.5-inch HDDs 50A are associated with ten 2.5-inch HDDs 50B, one 3.5-inch HDD 50A port address of "1" may be associated with three 2.5-inch HDD 50B addresses of "1," "4," and "9." That association can be arbitrarily set by an administrator or other person in charge of maintenance.

The above address management table 65 is provided for every protocol conversion chip 60.

(1-3-3) Connection Structure in the Disk Drive Unit

Figure 7:
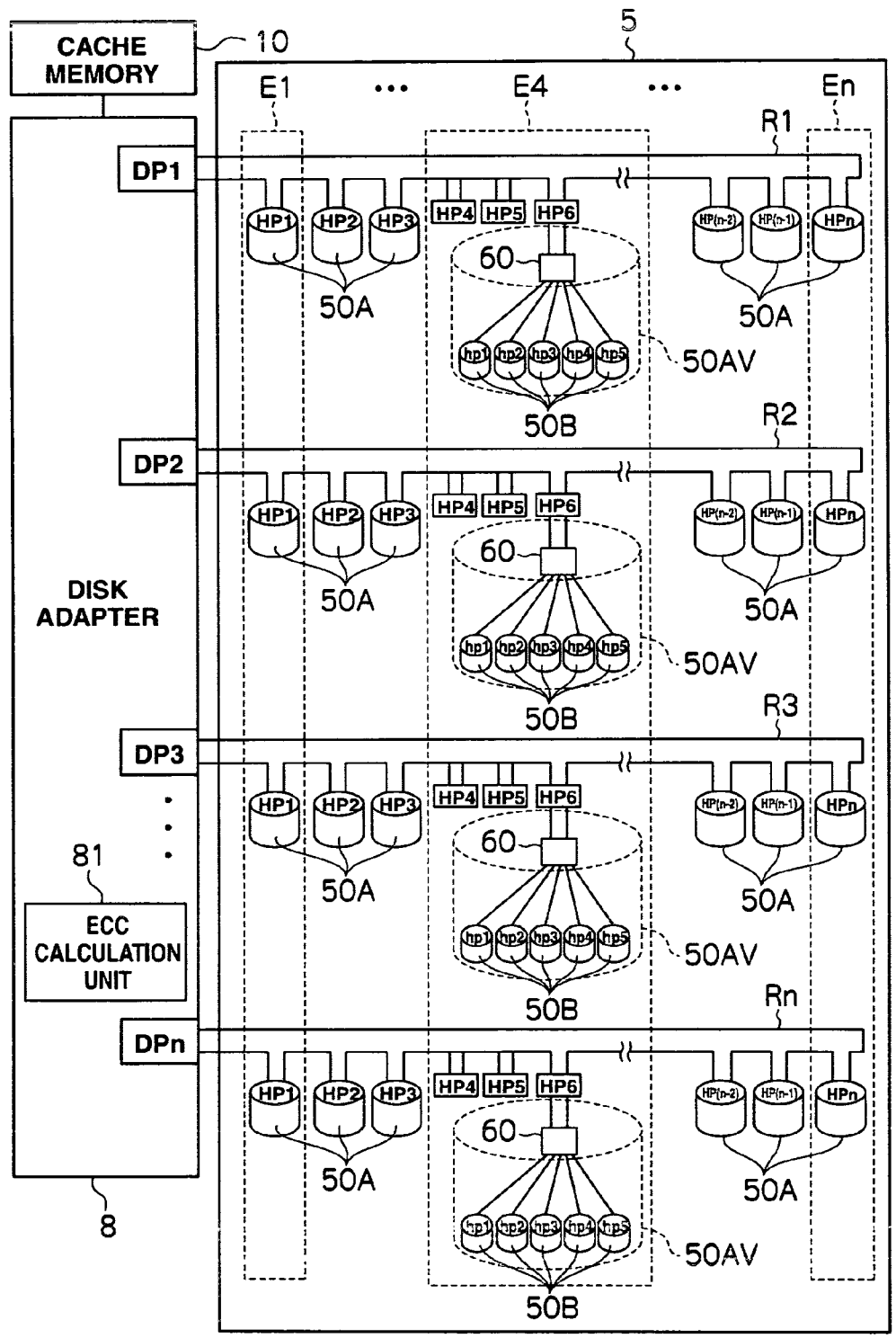
FIG. 7 illustrates the configuration of a disk drive unit according to the first embodiment.

Before explaining how data is stored in the HDDs having port addresses associated as above, how the disk adapter 8 and the disk drive unit 5 are connected in the first embodiment will be explained below. FIG. 7 illustrates the configuration of the disk drive unit 5 according to the first embodiment.

Conventional connection structures include: direct connection of one disk adapter 8 with one disk drive unit 5; and connection via Fibre Channel switches, and this embodiment employs a structure of connecting the disk adapter 8 and the disk drive unit 5 in loop.

As shown in FIG. 7, the disk adapter 8 has ports DP1 through DPn, each connected with the 3.5-inch HDDs 50A in loop. Each 3.5-inch HDD 50A that utilizes Fibre Channel has a port (HP1, HP2, . . . , HPn) given a sequential number as its identification number.

Each of the disk adapter 8 ports DP1 through DPn forms a loop (R1, R2, . . . , Rn) together with the 3.5-inch HDDs 50A, and the loops R1 through Rn are connected to the disk adapter 8 in parallel with each other at the respective ports DP1 through DPn. As shown by the dashed line in FIG. 7, the 3.5-inch HDDs 50A (including 2.5-inch HDDs 50B connected to the 3.5-inch HDD 50A port HP) in each parallel-connected loop and arranged in a line constitute an ECC group (E1, E2, . . . , En). Here, the ECC groups E1 through En are RAID groups. So, one or more logical volumes are established in a storage area provided by each ECC group.

In the first embodiment, five 2.5-inch HDDs 50B are connected to a 3.5-inch HDD 50A port HP6 given a port address of "6" via the protocol conversion chip 60. The five 2.5-inch HDDs 50B each have ports hp1 through hp5 given port addresses of "1" through "5" respectively Also, 3.5-inch HDD 50A ports HP4 and HP5 that are given port addresses of "4" and "5" respectively are closed, as shown in FIG. 7. Consequently, if the host apparatuses 2 command the storing of data in the 3.5-inch HDDs 50A designating any of the ports HP4 to HP6, that data will be stored in any of the 2.5-inch HDDs 50B having ports hp1 to hp5 given port addresses of "1" to "5" respectively, which results in the host apparatuses 2, disk adapter 8, and maintenance terminal 11 recognizing the five 2.5-inch HDDs 50B as one virtual hard disk drive (hereinafter referred to as a virtual HDD) 50AV. In particular, the disk adapter 8 recognizes the five 2.5-inch HDDs 50B as one virtual 3.5-inch HDD 50AV, which is indicated by a dashed line in FIG. 7. The virtual HDDs 50AV arranged in a line constitute one ECC group (E1, E2, . . . , En).

For example, when data is written, in response to a write request from a host apparatus 2, to the 3.5-inch HDDs 50A via the ports HP4 each given a port address of "4," that data and its parity information will be written to 'n' virtual HDDs 50AV arranged in a line. In actual operation, the processor 63 in each protocol conversion chip 60 refers to its address management table 65, and writes the data and parity information to the 2.5-inch HDDs 50B having ports hp1 and hp4, which are associated with the 3.5-inch HDD 50A port HP4.

(1-3-4) HDD Definition Procedures

Figure 9:
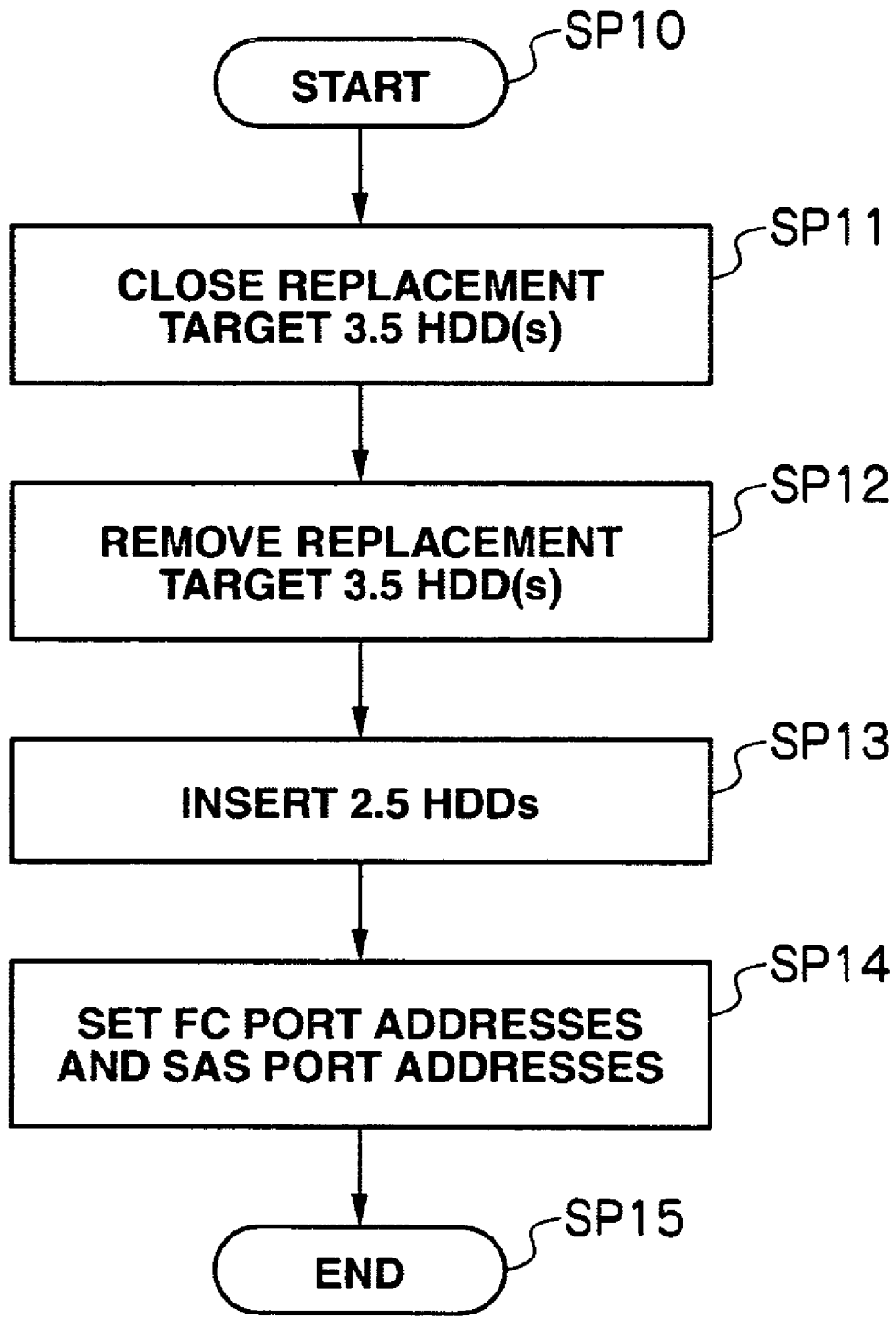
FIG. 9 is a flowchart explaining re-setting procedures for the storage apparatus according to the first embodiment.

If three 3.5-inch HDDs 50A are attached to five 2.5-inch HDDs 50B via the protocol conversion chip 60 as above, it is necessary to define HDD settings so that the host apparatuses 2, disk adapter 8 and maintenance terminal 11 can recognize those HDDs. FIGS. 8 and 9 are flowcharts showing the HDD definition procedures.

FIG. 8 shows specific operational steps for initial setting procedures when the storage apparatus 4 is started up.

More specifically, the procedures start when an administrator (or other person in charge of maintenance; the same applies to the below explanation) starts up a case 20 (SP0). The administrator installs 3.5-inch HDDs 50A and 2.5-inch HDDs 50B in the case 20 (SP1). When the administrator sets Fibre Channel port addresses HP1 through HPn and SAS port addresses hp1 through hp5 using the maintenance terminal 11 (SP2), the initial setting procedures end (SP3).

FIG. 9 shows a flowchart where the current disk device unit 5 is composed of 3.5-inch HDDs 50A using a Fibre Channel Protocol based data transfer system, and if some of those 3.5-inch HDDs 50A are going to be replaced and reset with 2.5-inch HDDs 50B using an SAS Protocol based data transfer system.

More specifically, the flowchart starts when the administrator is going to conduct resetting by replacing some of the 3.5-inch HDDs 50A constituting the current disk device unit 5 with 2.5-inch HDDs 50B (SP10). The administrator closes the port(s) of the replacement target 3.5-inch HDD(s) 50A using the maintenance terminal 11 (SP11). Then, the administrator removes the replacement target 3.5-inch HDD(s) 50A (SP12). The administrator inserts the corresponding number of 2.5-inch HDDs 50B into the place from which the 3.5-inch HDD(s) 50A have been removed (SP13). The administrator then sets Fibre Channel port addresses and SAS port addresses using the maintenance terminal 11 (SP14), and the re-setting steps end (SP15).

(1-3-5) Data Transfer Procedures

Figure 10:
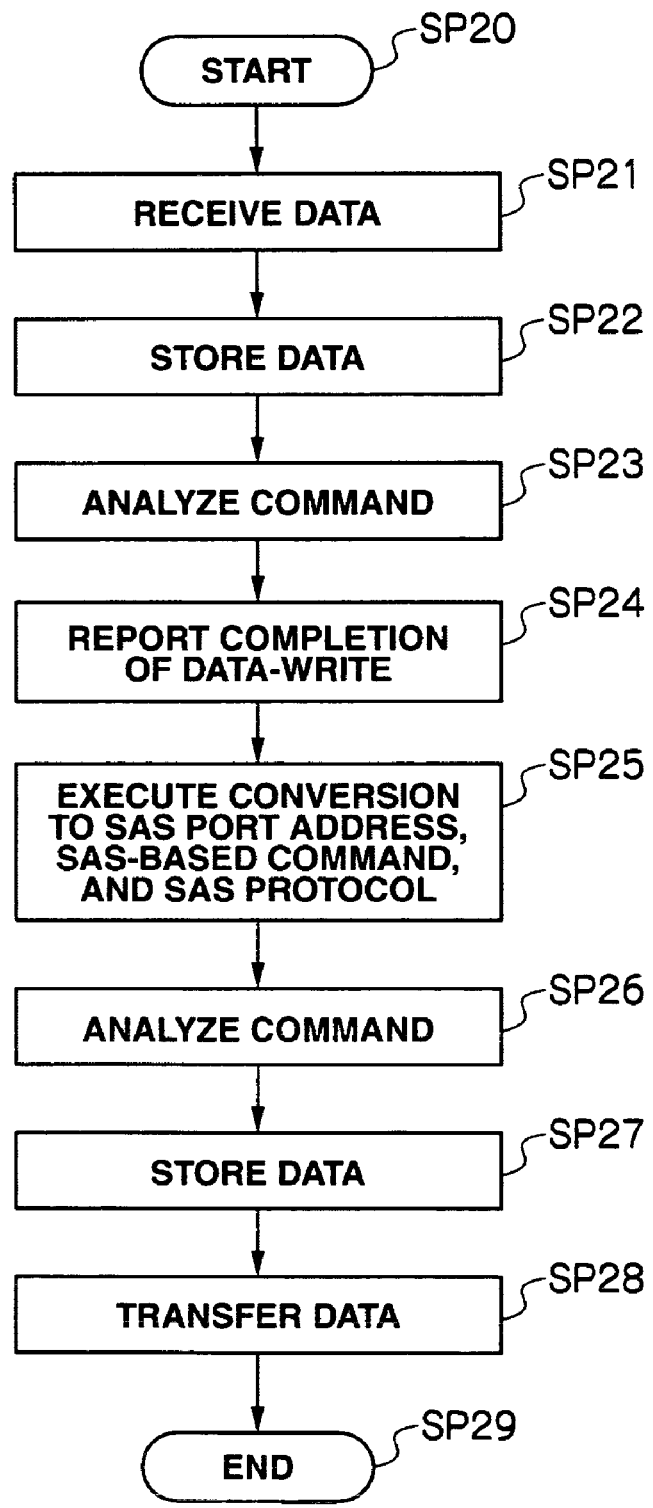
FIG. 10 is a flowchart showing data transfer procedures executed in the protocol conversion chip according to the first embodiment.

Next, how data is transferred to/from the hard disk drives 50A and 50B that have been defined by associating them in the address management table will be explained. FIG. 10 is a flowchart showing data transfer procedures executed in the protocol conversion chip 60. This flowchart explains the case where a write request has been made from the host apparatuses 2.

Upon receipt of a write request from the host apparatuses 2, the FC controller 61 starts data transfer processing (SP20). When the FC controller 61 receives data from the disk adapter 8 (SP21), the FC controller 61 temporarily stores the received data in its data buffer 612 (SP22).

The processor 63 analyzes the received command based on the protocol controller 611 (SP23).

After the processor 63 has analyzed the command regarding whether it is a write or read request, the processor 63 reports to the shared memory 9 that the relevant data-write has been completed (SP24).

The processor 63 then refers to the address management table 65 and the protocol conversion unit 66, and converts the FC port address, FC-based command, and FC Protocol into an SAS port address, SAS-based command, and SAS Protocol (SP25). For example, the processor 63 refers to the address management table and converts a 3.5-inch HDD port address of "4" into the associated 2.5-inch HDD 50B port addresses of "1" and "4."

Then, the SAS controller 62 analyzes the converted command to find whether it is a write or read request (SP26), and then temporarily stores the data in the data buffer 622 in the SAS controller 62 (SP27).

When the SAS controller 62 transfers the data to the 2.5-inch HDD(s) 50B utilizing SAS (SP28), the data transfer processing ends (SP29).

While FIG. 10 explains the processing in response to a data write request, in the case of a data read request, data is transferred via reversal of the above process.

(1-3-6) Data Recovery Steps

In the hard disk drives 50A and 50B that constitute the ECC groups E1 through En as shown in FIG. 7 how data is recovered if failures occur in data stored in those hard disk drives 50A and 50B will be explained below.

Figure 11:
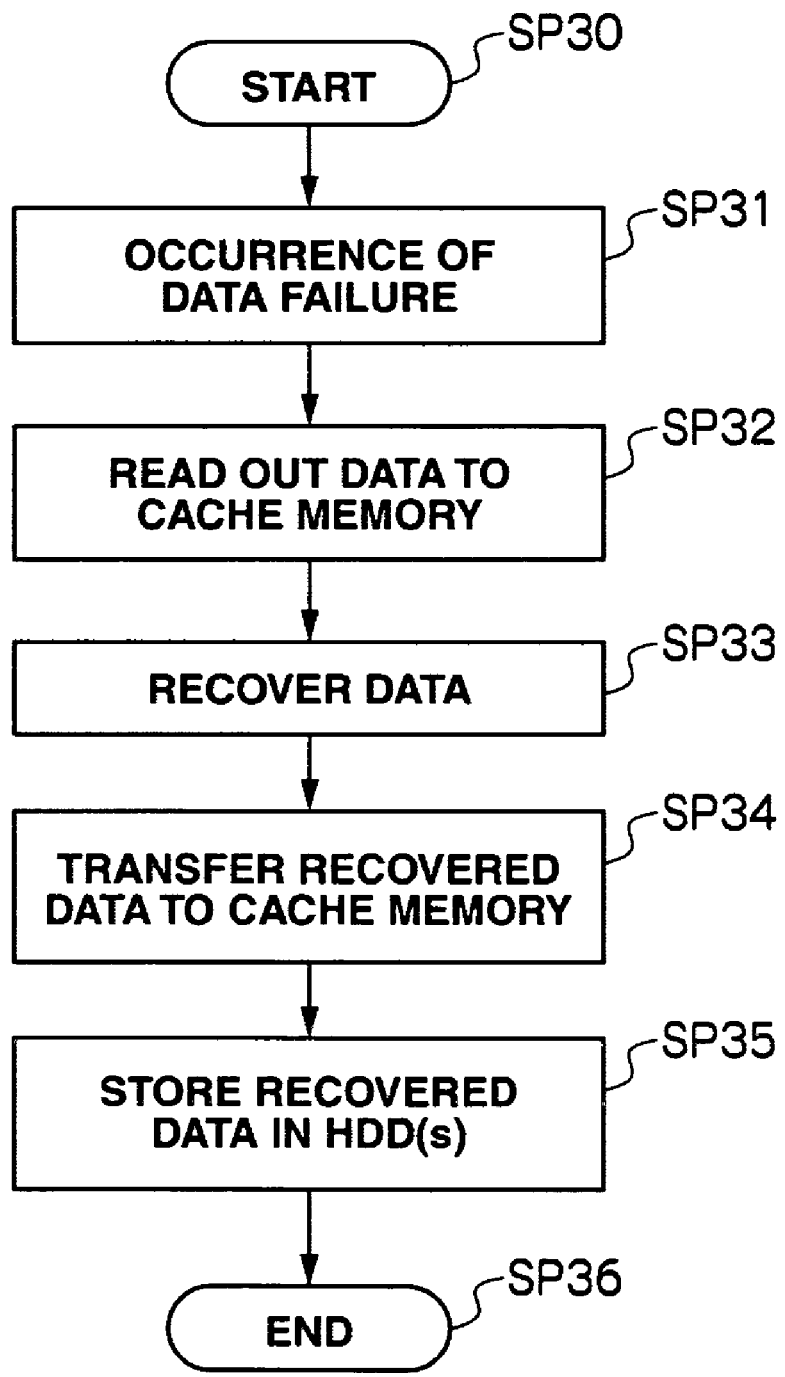
FIG. 11 is a flowchart showing data recovery executed if data fails in the storage system according to the first embodiment.

FIG. 11 is a flowchart showing data recovery executed if a certain data failure occurs.

More specifically, if the disk adapter 8 recognizes a failure in data stored in the 3.5-inch HDDs 50A or 2.5-inch HDDs 50B, the data recovery processing starts (SP30).

When the disk adapter 8 recognizes a data failure (SP31), the disk adapter 8 reads out data stored in the hard disk drives 50A and 50B constituting the relevant ECC group (E1, E2, . . . , En) to the cache memory 10 (SP32).

Then, the disk adapter 8 calculates the failed data from the read-out data and parity information using the ECC calculation unit 81 incorporated in the disk adapter 8, and recovers the failed data (SP33).

The disk adapter 8 transfers the recovered data to the cache memory 10 (SP34). After that, the disk adapter 8 again stores the recovered data in the hard disk drive(s) 50A (and 50B) where the failed data was originally stored (SP35), and then the data recovery processing ends (SP36).

If a data failure occurs in the 2.5-inch HDDs 50B, the disk adapter 8 reads out the relevant data to the cache memory 10 by referring to the address management table 65 in the protocol conversion chip 60 and conducting the conversion of data addresses, protocols and commands.

(1-4) Effects of the First Embodiment

As described above, in the storage system 1 according to this embodiment, the address management table 65 is formed in the memory unit 64 in the protocol conversion chip 60. Accordingly, it is possible to provide a storage apparatus and conversion board that can increase the number of hard disk drive heads in a given, limited space for installation of disk units in the storage apparatus, and can consequently improve data read/write performance.

Also, some 2.5-inch HDDs 50B are connected to one of the disk adapter 8 ports via the protocol conversion chip 60, in parallel with some other 2.5-inch HDDs 50B connected to another of the disk adapter 8 ports, and the parallel-arranged 2.5-inch HDDs 50B constitute an ECC group (E1, E2, . . . En). Accordingly, if one of the disk adapter 8 ports DP1 through DPn fails, failed data can be recovered from the data and parity information stored in the 2.5-inch HDDs 50B connected to the other ports, so the reliability of data can be further improved.

Moreover, since some 2.5-inch HDDs 50B are connected to one of the disk adapter 8 ports via the protocol conversion chip 60, in parallel with some other 2.5-inch HDDs 50B connected to another of the disk adapter 8 ports, the 2.5-inch HDDs 50B that run in parallel increase both in number and in capacity, which can increase data access speed and realize much faster data read/write processing.

Fibre Channel-based data transfer speed is 4 Gbps, while SAS-based data transfer speed is 3 Gbps, i.e., the SAS-based data transfer speed is lower than the Fibre Channel-based data transfer speed, which normally causes delays in data-write and a deterioration in disk performance. However, the FC controller 61 reports to the shared memory 9 that relevant data-write has been completed when the FC controller 61 stores the relevant data in the data buffer 612 in the FC controller 61 in the protocol conversion chip 60, and after that, the SAS controller 62 writes data to the 2.5-inch HDDs 50B at an SAS-based speed, which results in the avoidance of any delay in data-write. The provision of the protocol conversion chip 60 makes it possible to avoid any deterioration in disk performance.

(2) Second Embodiment

Next, a storage system 1 according to a second embodiment is explained Only the second embodiment's differences from the first embodiment are explained below.

(2-1) Connection Structure in the Disk Drive Unit

Figure 12:
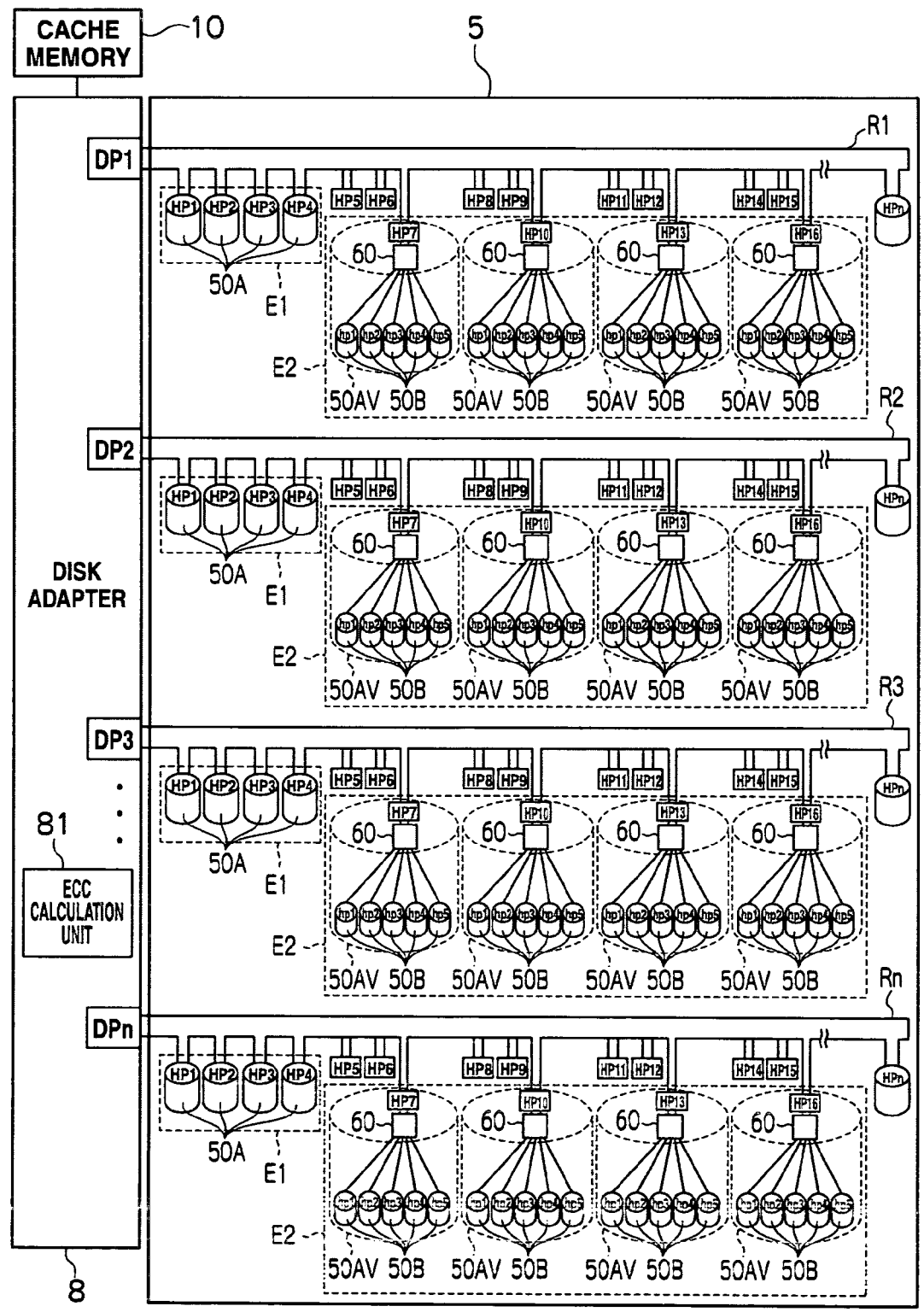
FIG. 12 illustrates the configuration of a disk drive unit according to a second embodiment.

The connection structure between the disk adapter 8 and the disk drive unit 5 in the second embodiment is explained. FIG. 12 illustrates the configuration of the disk drive unit 5 according to the second embodiment.

As shown in FIG. 12, each of the disk adapter 8 ports DP1 through DPn is connected with the 3.5-inch HDDs 50A in loop. Each 3.5-inch HDD 50A that utilizes a Fibre Channel Protocol based data transfer system has a port (HP1, HP2, . . . , HPn) given a sequential number.

Also, each of the disk adapter 8 ports DP1 through DPn forms a loop (R1, R2, . . . , Rn) together with the 3.5-inch HDDs 50A, and the loops R1 through Rn are connected to the disk adapter 8 in parallel with each other at the respective ports DP1 through DPn.

As shown by the dashed line in FIG. 12, serially-connected four 3.5-inch HDDs 50A constitute an ECC group (E1, E2, . . . , En). In particular, serially-connected four virtual HDDs 50AV constitute an ECC group E2. Also, one virtual HDD 50AV is connected with five 2.5-inch HDDs 50B via the protocol conversion chip 60. Since every protocol conversion chip 60 has an address management table 65, the ECC group E2 has four address management tables.

In the ECC group E2 in the second embodiment, the 3.5-inch HDD 50A ports HP7, HP10, HP13 and HP 16 given port addresses of "7," "10," "13" and "16" respectively are each connected to five 2.5-inch HDDs 50B via the protocol conversion chips 60. The five 2.5-inch HDDs 50B each have ports hp1 through hp5 given port addresses of "1" through "5" respectively.

Also, the 3.5-inch HDD 50A ports HP5, HP6, HP8, HP9, HP11, HP12, HP14 and HP15, given port addresses of "5," "6," "8," "9," "11," "12," "14" and "15" respectively, are closed as shown in FIG. 12. As a result, when the host apparatuses 2 command the storing of data in the 3.5-inch HDDs 50A designating any of the ports HP5 through HP16 given port addresses of "5" through "16" respectively, that data will be stored in any of the relevant 2.5-inch HDDs 50B having ports hp1 through hp5, which results in the host apparatuses 2, disk adapter 8, and maintenance terminal 11 recognizing five 2.5-inch HDDs 50B as one virtual 3.5-inch HDD 50AV.

For example, when data is written, in response to a write request from a host apparatus 2, to the 3.5-inch HDDs 50A via the port HP8 given a port address of "8," that data and its parity information will be written to the serially-arranged four virtual HDDs 50AV. In actual operation, the processor 63 in the relevant protocol conversion chip 60 refers to its address management table 65, and writes the data and parity information to the 2.5-inch HDDs 50B having the ports hp1 and hp4, which are associated with the 3.5-inch HDD 50A port HP8.

Other than the above connection structure in the disk drive unit 5, the second embodiment is the same as the first embodiment, so further explanation is omitted.

(2-2) Effects of the Second Embodiment

As described above, in the second embodiment, the address management table 65 is formed in the memory unit 64 in the protocol conversion chip 60. Accordingly, it is possible to provide a storage apparatus and conversion board that can increase the number of hard disk drive heads in a given, limited space for installation of disk units in the storage apparatus, and can consequently improve data read/write performance.

Also, some 2.5-inch HDDs 50B connected with one 3.5-inch HDD 50A port via the protocol conversion chip 60, and some other 2.5-inch HDDs 50B connected with another 3.5-inch HDD 50A port are serially connected to one port of the disk adapter 8, and the serially-arranged 2.5-inch HDDs 50B constitute an ECC group (E1, E2, . . . , En). Accordingly, a RAID group can be formed in one disk adapter port, so data can be recovered in only one disk adapter port.

Moreover, the provision of the protocol conversion chip 60 makes it possible to avoid any deterioration in disk performance.

(3) Third Embodiment

Next, a storage system 1 according to a third embodiment is explained. Only the third embodiment's differences from the first and second embodiments are explained below.

(3-1) Connection Structure in the Disk Drive Unit

Figure 13:
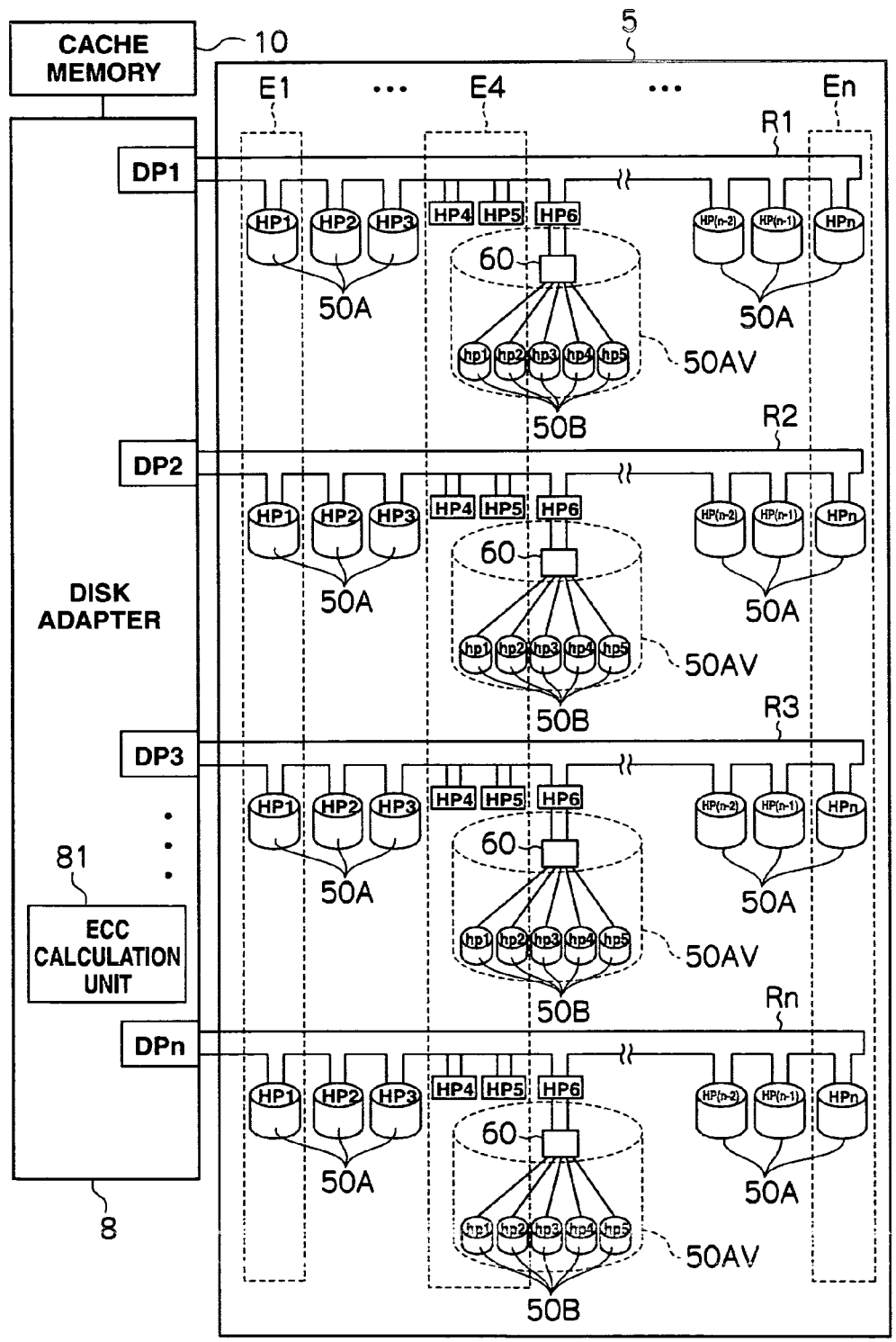
FIG. 13 illustrates the configuration of a disk drive unit according to a third embodiment.

The connection structure between the disk adapter 8 and the disk drive unit 5 in the third embodiment is explained. FIG. 13 illustrates the configuration of the disk drive unit 5 according to the third embodiment.

As shown in FIG. 13, each of the disk adapter 8 ports DP1 through DPn is connected with the 3.5-inch HDDs 50A in loop. Each 3.5-inch HDD 50A that utilizes a Fibre Channel Protocol based data transfer system has a port (HP1, HP2, . . . , HPn) given a sequential number.

Also, each of the disk adapter 8 ports DP1 through DPn forms a loop (R1, R2, . . . , Rn) together with the 3.5-inch HDDs 50A, and the loops R1 through Rn are connected to the disk adapter 8 in parallel with each other at the respective ports DP1 through DPn.

As shown by the dashed line in FIG. 13, the 'n' 3.5-inch HDDs 50A connected parallel and arranged in a line constitute one ECC group (E1, E2, . . . , En). One virtual HDD 50AV is connected to five 2.5-inch HDDs 50B via the protocol conversion chip 60. Two of the five 2.5-inch HDDs 50B constitute an ECC group E4, via the protocol conversion chip 60. Also, since every protocol conversion chip 60 has an address management table 65, the ECC group E4 in FIG. 13 includes 'n' address management tables 65.

In the third embodiment, for example, five 2.5-inch HDDs 50B are connected to the 3.5-inch HDD 50A port HP6 given a port address of "6" via the protocol conversion chip 60. The five 2.5-inch HDDs 50B have ports hp1 through hp5 given port addresses of "1" to "5" respectively.

The 3.5-inch HDD 50A ports HP4 and HP5 given port addresses of "4" and "5" respectively are closed, and it is the same as in the second embodiment, so detailed explanation is omitted. Also, other than the above connection structure in the disk drive unit 5, the third embodiment is the same as the first embodiment, so further explanation is omitted.

(3-2) Effects of the Third Embodiment

As described above, in the third embodiment, the address management table 65 is formed in the memory unit 64 in the protocol conversion chip 60. Accordingly, it is possible to provide a storage apparatus and conversion board that can increase the number of hard disk drive heads in a given, limited space for installation of disk units in the storage apparatus, and can consequently improve data read/write performance.

Also, several ECC groups (E4 and others) are constituted by some 2.5-inch HDDs 50B connected to one of the disk adapter 8 ports via the protocol conversion chip 60 and some other 2.5-inch HDDs 50B parallel connected to another of the disk adapter 8 ports. Since this embodiment can form several ECC groups (E4 and others) from the 2.5-inch HDDs 50B, it is effective in the case where data is distributed to several ECC groups and accessed.

Moreover, the provision of the protocol conversion chip 60 makes it possible to avoid any deterioration in disk performance.

(4) Fourth Embodiment

Next, a storage system according to a fourth embodiment is explained. Only the fourth embodiment's differences from the first to third embodiments are explained below.

(4-1) Connection Structure in the Disk Drive Unit

Figure 14:
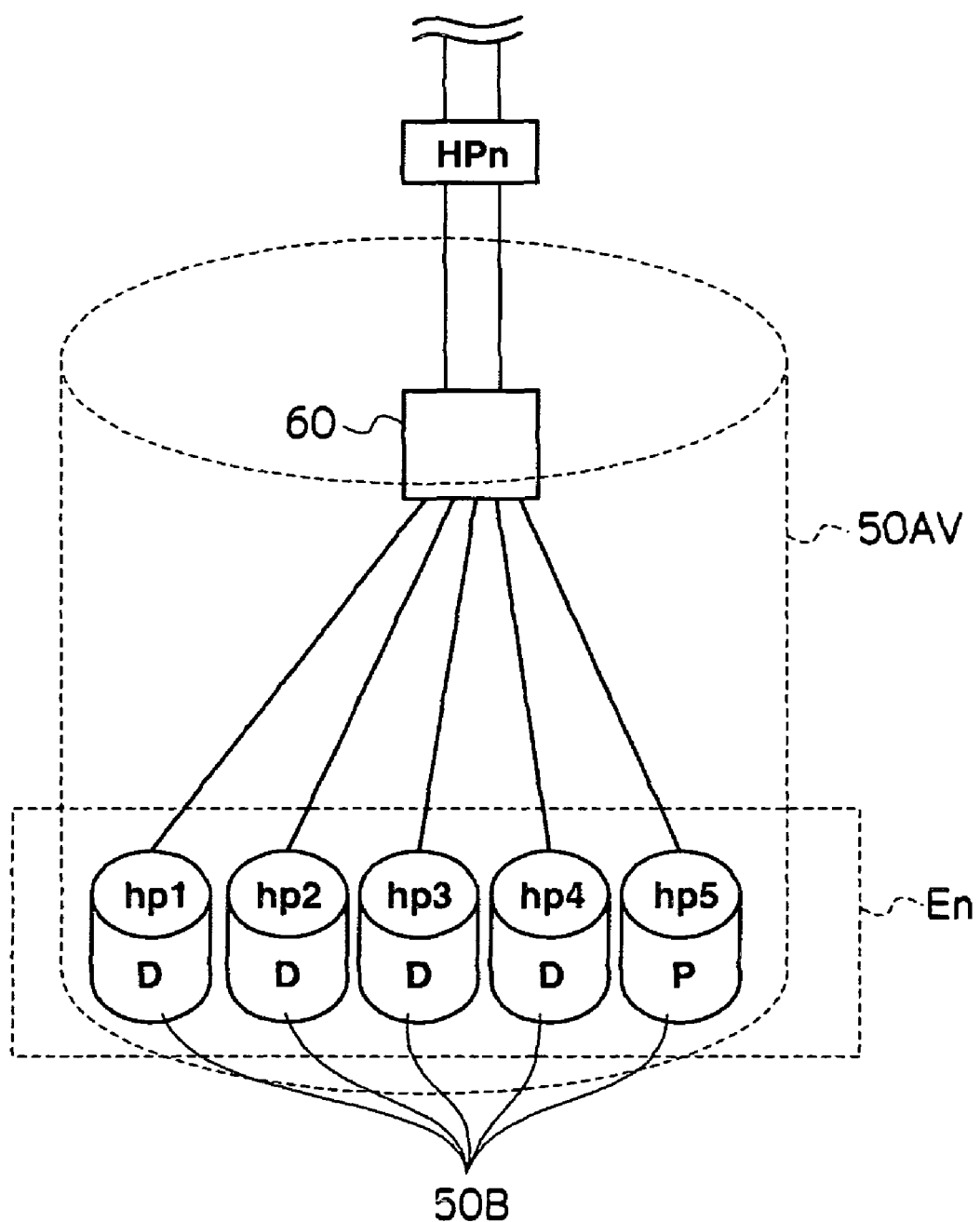
FIG. 14 illustrates the configuration of a part of a disk drive unit according to a fourth embodiment.

The connection structure in the disk drive unit 5 in the fourth embodiment is explained. FIG. 14 illustrates the configuration of a part of the disk drive unit 5 according to the fourth embodiment.

As shown in FIG. 14, one virtual HDD 50AV is associated with one 3.5-inch HDD port HPn, and that virtual HDD 50AV is composed of five 2.5-inch HDDs 50B connected via the protocol conversion chip 60. The five 2.5-inch HDDs 50B constitute an ECC group En, as shown by the dashed line in FIG. 14. More specifically, four 2.5-inch HDDs 50B store data and the remaining one 2.5-inch HDD 50B stores parity information for the data. The so-configured virtual HDD 50AV is connected with one of the ports DP1 through DPn of the disk adapter 8 to form a loop (R1, R2, . . . , Rn).

(4-2) Address Management Table

An address management table 65 in the case where an ECC group En is formed within one virtual HDD 50AV is explained below with reference to FIG. 15.

In the address management table 65 in the above case, a port address of "1" in the "FC port address" field 65A is associated with a port address of "1" in the "SAS port address" field 65B. Likewise, a 3.5-inch HDD port address of "m" is associated with a 2.5-inch HDD port address of "m."

That is, since the fourth embodiment associates one 3.5-inch HDD 50A with one 2.5-inch HDD 50B, the address management table 65 stores the association as shown in FIG. 15. That association is arbitrarily established by an administrator, or other person in charge of maintenance.

(4-3) Effects of the Fourth Embodiment

As described above, in the fourth embodiment, the address management table 65 is formed in the memory unit 64 in the protocol conversion chip 60. Accordingly, it is possible to provide a storage apparatus and conversion board that can increase the number of hard disk drive heads in a given, limited space for installation of disk units in the storage apparatus, and can consequently improve data read/write performance.

Also, in the fourth embodiment, since an ECC group En is formed within one virtual HDD 50AV, if one of the 2.5-inch HDDs 50B fails, data recovery can be realized only within those 2.5-inch HDDs 50B in one virtual HDD AV, and the 2.5-inch HDDs can be replaced or maintained one by one.

(5) Other Embodiments

The above embodiments explain a case where the disk adapter 8 receives and transfers a data read/write request even if it is directed to a closed port (HP1, HP2, . . . , HPn). However, the present invention is not limited to the above, and any closed port (HP1, HP2, . . . , HPn) may be given a certain flag and the disk adapter 8 may instruct the disk device unit 5 not to execute data read/write requests for closed ports.

Also, in the above embodiments, a storage apparatus 4 has 3.5-inch HDDs 50A as a plurality of first disk units of a specific size, each removable, and a controller 6 that controls data read/write from/to the 3.5-inch HDDs 50A, and that storage apparatus 4 includes: FC connectors 53 (external connectors), each provided in the corresponding positions where the 3.5-inch HDDs 50A are installed, and each physically and electrically connected with the 3.5-inch HDDs 50A installed in a specific state; and a removable protocol conversion chip 60 (conversion unit) provided in one or more of the FC connectors 53, and used for installing, in the position where one or more of the 3.5-inch HDDs 50A are to be installed, a larger number of 2.5-inch HDDs 50B (second disk units), each smaller in physical size, than the one or more 3.5-inch HDDs 50A. However, the invention is not limited to the above. The disk units are not limited to 3.5-inch HDDs 50A and 2.5-inch HDDs 50B, and the present invention can be applied to systems that include at least two types of disk units with different storage capacity.

Also, in the above embodiments, the protocol conversion chip 60 includes: an FC connector 58 (a first connector) physically and electrically connected with the above-mentioned FC connectors 53; and SAS connectors 54 (a plurality of second connectors), each provided in the corresponding positions where the 2.5-inch HDDs 50B are installed, and each physically and electrically connected with the 2.5-inch HDDs 50B installed in a specific state, and the FC connector 58 is electrically connected with the corresponding SAS connectors 54. However, the invention is not limited to the above, and multiple FC connectors 58 and multiple SAS connectors 54 may be electrically connected with each other.

The present invention can be applied to a storage system having one or more storage apparatuses, and it can also be applied widely to other types of storage systems.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage apparatus, the storage apparatus comprising:
    a plurality of first disk units, each first disk unit having a first physical size and being removable;
    a plurality of second disk units, each second disk unit having a second physical size that is smaller than the first physical size;
    a plurality of Fibre Channel (FC) ports each associated with a respective port address of an FC interface;
    a plurality of Serial Attached Small Computer System Interface (SAS) ports each associated with a respective port address of an SAS interface, each of a first, second, third, and fourth FC ports of the plurality of FC ports being connected to a respective set of second disk units of the plurality of second disk units through a respective set of SAS ports of the plurality of SAS ports;

a controller that is connected to the plurality of FC ports and controls data read/write from/to the first disk units, the controller forming a plurality of Error Correcting Code (ECC) groups, each ECC group being formed with either one or more first disk units of the plurality of first disk units or one or more second disk units of the plurality of second disk units, a first ECC group of the plurality of ECC groups being formed with a first second disk unit of the respective set of second disk units connected to the first FC port, a second second disk unit of the respective set of second disk units connected to the second FC port, a third second disk unit of the respective set of second disk units connected to the third FC port, and a fourth second disk unit of the respective set of second disk units connected to the fourth FC port;

a plurality of external connectors, each provided in corresponding positions where a respective set of the first disk units of the plurality of first disk units are installed, and physically and electrically connected with the respective set of first disk units installed in a specific state; and a removable conversion unit provided in one or more external connectors of the plurality of external connectors, and used for installing, in a first corresponding position where one or more first disk units of the plurality of first disk units are installed, a larger number of second disk units of the plurality of second disk units.

2. The storage apparatus according to claim 1, wherein the removable conversion unit comprises:

one or more FC ports of the plurality of FC ports each physically and electrically connected with one or more external connectors of the plurality of external connectors; and a first set of SAS ports of the plurality of SAS ports each provided in corresponding positions where the larger number of second disk units are installed, and physically and electrically connected with the larger number of second disk units installed in a specific state;

wherein the one or more FC ports are electrically connected with the first set of SAS ports.

3. The storage apparatus according to claim 2, wherein the removable conversion unit further comprises an address conversion unit for converting between port addresses assigned to the one or more FC ports and port addresses assigned to the first set of SAS ports.

4. The storage apparatus according to claim 3, wherein the address conversion unit includes an address management table in which the correlation between the port addresses assigned to the one or more FC ports and the port addresses assigned to the first set of SAS ports is stored, and the address conversion unit converts between the port addresses assigned to the one or more FC ports and the port addresses assigned to the first set of SAS ports using the address management table.

5. The storage apparatus according to claim 2, wherein the removable conversion unit further comprises a protocol conversion unit for converting, between the one or more FC ports and the first set of SAS ports, a first communication protocol used by the plurality of first disk units to/from a second communication protocol used by the plurality of second disk units.

6. The storage apparatus according to claim 2, wherein the removable conversion unit further comprises a storage unit for temporarily storing data to be read/written from/to the larger number of second disk units.

7. The storage apparatus according to claim 1, wherein each of the first, second, third, and fourth FC ports are connected to a respective loop of a plurality of loops each connected to a respective external connector of the plurality of external connectors.

8. A method for installing a plurality of first disk units and a plurality of second disk units in a storage apparatus, each first disk unit having a first physical size and each second disk unit having a second physical size that is smaller than the first physical size, the method comprising:

associating each Fibre Channel (FC) port of a plurality of FC ports with a respective port address of an FC interface;

associating each Serial Attached Small Computer System Interface (SAS) port of a plurality of SAS ports with a respective port address of an SAS interface;

connecting each of a first, second, third, and fourth FC ports of the plurality of FC ports to a respective set of second disk units of the plurality of second disk units through a respective set of SAS ports of the plurality of SAS ports;

connecting a controller to the plurality of FC ports that controls data read/write from/to the first disk units and forms a plurality of Error Correcting Code (ECC) groups that are each formed with either one or more first disk units of the plurality of first disk units or one or more second disk units of the plurality of second disk units, the plurality of ECC groups including a first ECC group formed with a first second disk unit of the respective set of second disk units connected to the first FC port, a second second disk unit of the respective set of second disk units connected to the second FC port, a third second disk unit of the respective set of second disk units connected to the third FC port, and a fourth second disk unit of the respective set of second disk units connected to the fourth FC port;

physically and electrically connecting a plurality of external connectors with a respective set of first disk units of the plurality of disk units, the plurality of external connectors being provided in corresponding positions where the respective set of the first disk units are installed; and installing, in a first corresponding position where one or more first disk units of the plurality of first disk units are installed, a larger number of second disk units of the plurality of second disk units using a removable conversion unit provided in one or more external connectors of the plurality of external connectors.

9. The method according to claim 8, wherein the removable conversion unit comprises:

one or more FC ports of the plurality of FC ports each physically and electrically connected with one or more external connectors of the plurality of external connectors; and a first set of SAS ports of the plurality of SAS ports each provided in corresponding positions where the larger number of second disk units are installed, and physically and electrically connected with the larger number of second disk units installed in a specific state;

wherein the one or more FC ports are electrically connected with the first set of SAS ports.

10. The method according to claim 9, wherein the removable conversion unit further comprises an address conversion unit for converting between port addresses assigned to the one or more FC ports and port addresses assigned to the first set of SAS ports.

11. The method according to claim 10, wherein the address conversion unit includes an address management table in which the correlation between the port addresses assigned to the one or more FC ports and the port addresses assigned to the first set of SAS ports is stored, and the address conversion unit converts between the port addresses assigned to the one or more FC ports and the port addresses assigned to the first set of SAS ports using the address management table.

12. The method according to claim 9, wherein the removable conversion unit further comprises a protocol conversion unit for converting, between the one or more FC ports and the first set of SAS ports, a first communication protocol used by the plurality of first disk units to/from a second communication protocol used by the plurality of second disk units.

13. The method according to claim 9, wherein the removable conversion unit further comprises a storage unit for temporarily storing data to be read/written from/to the larger number of second disk units.

14. The method according to claim 8, further comprising connecting each loop of a plurality of loops to a respective external connector of the plurality of external connectors and connecting each of the first, second, third, and fourth FC ports to a respective loop of the plurality of loops.

* * * * *